United States Patent [19]
Swanson

[11] 3,832,051
[45] Aug. 27, 1974

[54] PROJECTOR DISSOLVE CONTROL
[75] Inventor: Allen K. Swanson, Walpole, Mass.
[73] Assignee: Hamton Engineering Associates, Inc., Norwood, Mass.
[22] Filed: Oct. 16, 1972
[21] Appl. No.: 297,948

[52] U.S. Cl. ................................................ 353/86
[51] Int. Cl. .......................................... G03b 23/16
[58] Field of Search ................................ 353/86, 83

[56] References Cited
UNITED STATES PATENTS
3,622,236  11/1971  Novy .................................... 353/86
3,740,130  6/1973  Wagemsonner ..................... 353/86
FOREIGN PATENTS OR APPLICATIONS
1,472,116  1/1969  Germany ............................. 353/86

Primary Examiner—Louis R. Prince
Assistant Examiner—A. Jason Mirabito
Attorney, Agent, or Firm—Wolf, Greenfield & Sacks

[57] ABSTRACT

An adapter for insertion into the remote function receptacle of a conventional slide projector to receive operating power therefrom and for providing a gradual fading in and out of the picture displayed by each slide. The adapter includes one timing circuit for providing automatic slide advancement having adjustable means for controlling the time interval between slides, and another timing circuit for controlling the rate at which the fading in and out, or dissolve, of the picture takes place.

20 Claims, 3 Drawing Figures

PROJECTOR DISSOLVE CONTROL

BACKGROUND OF THE INVENTION

The present invention relates in general to adapters for use with slide projectors. More particularly, the present invention is concerned with an adapter including at least one timing circuit and preferably for insertion into the remote function receptacle, or the like connector means, of the projector for providing adjustable and automatic picture dissolve and adjustable and automatic slide advancement. It is also preferred that the adapter receive operating power via the remote function receptacle of the projector thus obviating the need for its own power source.

For many visual presentations using a slide projector, such as the presentation of visual displays in association with a lecture, for example, it is often desirable to operate the slide projector or projectors in a dissolve mode of operation. With this type of operation the projector lamp illumination is raised over a predetermined time period, sustained at full illumination and lowered over a second predetermined time period. A slide advance occurs when the lamp is off. This gradual change in lamp illumination causes a gradual fading in and out of the picture, thereby eliminating the abrupt change in picture illumination normally created by a slide projector as it advances from one slide to the next.

There are numerous electronic dissolve devices presently available most of which are adapted for use with two or more slide projectors. These dissolve devices alternately increase the illumination of (dissolve up) the lamp in one slide projector, while the illumination of the lamp in the second slide projector is decreased (dissolved down). A slide advance is usually facilitated during the interim period either after the lamp of one projector turns off or just prior to the lamp of the second projector turning on.

Presently available dissolve control devices are generally as large as the slide projector itself, and, generally speaking, they are adapted for use with two or more slide projectors. Also, additional line power is required to operate the dissolve control unit which may be a drawback in certain instances. One or more projector control cables are also required for each line projector in use. Hence, when a dissolve control unit is used with two or more projectors there is always a need for additional storage space which may be at a premium, especially in large multiple projection installations, for housing the additional equipment and cables.

Accordingly, one important object of the present invention is to provide an adapter for use in conjunction with a slide projector for providing automatic dissolve control.

Another object of the present invention is to provide an adapter in accordance with the preceding object and including means for providing automatic and continuous slide advancement.

Still another object of the present invention is to provide an adapter in accordance with the preceding objects which includes means for adjusting the rate of dissolve for both the fading in and fading out of the picture displayed by each slide.

A further object of the present invention is to provide an adapter in accordance with the preceding objects wherein the adapter receives operating power by way of the remote function receptacle, or other like connector means, thus obviating the need for its own power source.

Still a further object of the present invention is to provide a timing adapter for use with a slide projector which also includes means for adjusting the time interval between slides.

Another object of the present invention is to provide a relatively small electronic solid state adapter which is received preferably in the remote function receptacle of the projector, that is easily used with existing slide projectors, that is compact, that is relatively inexpensive to manufacture, and that may be easily modified, if need be, to fit different types of slide projectors.

SUMMARY OF THE INVENTION

To accomplish the foregoing and other objects of the present invention, there is provided for a slide projector, an adapter received by a remote function receptacle, or the like connector means, of the projector for providing automatic picture dissolve. This adapter generally comprises a cycle timer defining a first time period between slide advances, means coupled from the connector means for providing power to the adapter, and a dissolve timer defining a pair of time periods each of a duration less than the first time period. The adapter also includes means, including a driver circuit, responsive to the termination of the first time period defined by the cycle timer for providing a signal to means of the slide projector to cause a slide advance. In the preferred embodiment the advance driver of the adapter couples to power control means of the adapter and when a slide advance is to occur the driver shorts out the power control means for causing an attendant energization of a solenoid of the projector for causing a forward slide advance. A means, which is illustratively shown as a lamp control circuit, couples between the connector means and the dissolve timer and is adapted to illuminate the lamp of the projector at a full light level during at least a portion of the first time period and at an increasing and decreasing light level, respectively, during the time periods defined by the dissolve timer. The dissolve timer preferably has an adjustable time period, as does the cycle timer, for controlling both the rate at which the picture is brought up to full illumination and the rate at which the picture fades out.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

Figure 1:
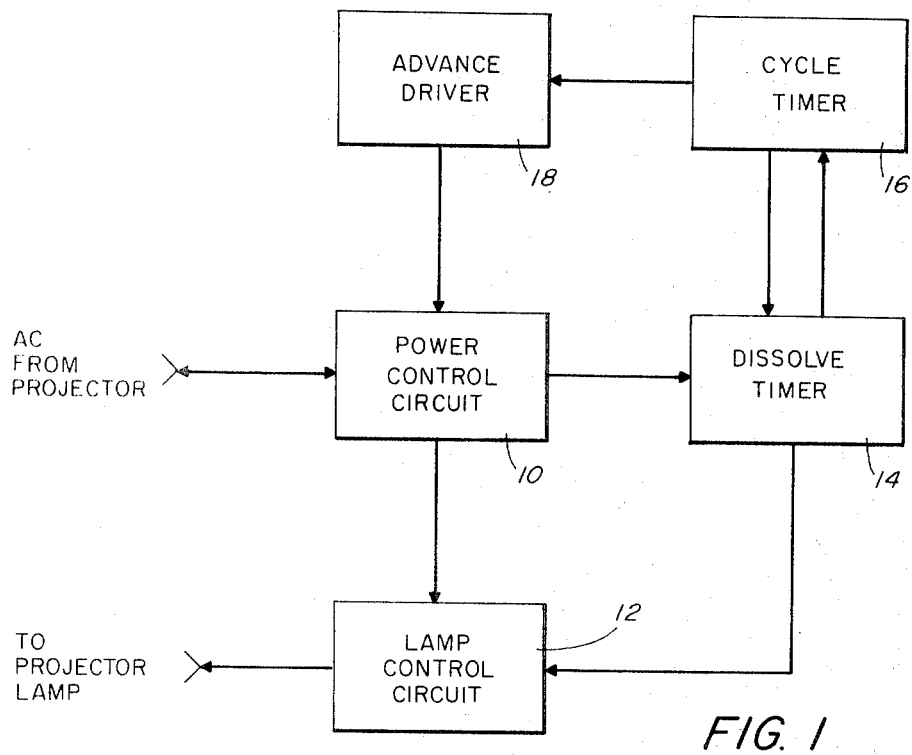
FIG. 1 is a block diagram of an adapter constructed in accordance with the principles of the present invention.

Referring now to the drawings and in particular to FIG. 1, there is shown a block diagram of the adapter of the present invention. This adapter is for use in association with a typical slide projector for dissolving up and down the lamp of the slide projector. The adapter is preferably inserted in the remote function receptacle, shown in FIG. 2, of a typical slide projector such as a Kodak carousel-type slide projector Model 700.

The block diagram of FIG. 1 shows a power control circuit 10 which has an AC power input from the projector, and a lamp control circuit 12 which has an output coupled to the lamp of the projector for controlling the illumination thereof. FIG. 1 also shows a dissolve timer 14, cycle timer 16 and advance driver 18.

It can be initially assumed that the lamp control circuit 12 is conditioned to illuminate the projector lamp at a constant full illumination and that the cycle timer 16, which defines the time interval between slide advances, is about to time out. At the end of the first time period defined by the cycle timer, an output signal is coupled from the cycle timer to the dissolve timer 14 and the output of dissolve timer 14, which couples to lamp control circuit 12, controls the fading out of the projector lamp at a constant predetermined dissolve rate. When the lamp has sufficiently dissolved the cycle timer has an output that couples to the advance driver 18 whose output then couples to the control circuit 10 thereby signalling the projector to slide advance. The control circuit 10 preferably includes a shunting means for facilitating slide advancement by way of the remote function receptacle, shown at 29 in FIG. 2.

During the slide advancement the AC power is interrupted to power control circuit 10. After a short time interval power is again applied to power control circuit 10 and the input from there to dissolve timer 14 controls the dissolve timer 14 which in turn controls the lamp control circuit 12 to cause a gradual increase in the illumination of the projector lamp, shown at 26 in FIG. 2. After the lamp has reached full illumination, it remains in that condition until the cycle timer 16 again times out at which time the cycle repeats and the lamp gradually fades out causing a subsequent slide advance.

Figure 2:
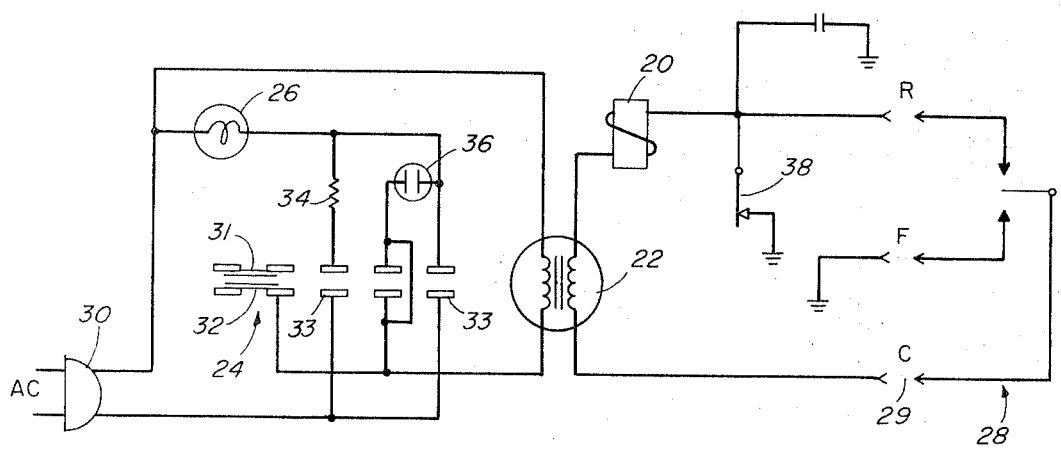
FIG. 2 is a schematic circuit diagram of the slide advance control circuitry of a typical slide projector such as the Kodak model 700 slide projector.

In FIG. 2 there is shown a circuit schematic diagram of the circuit means in the projector for providing both reverse and forward remote slide advancement. The circuitry of FIG. 2 comprises a slide advance solenoid 20, a drive motor 22, a slide switch 24, a lamp 26, and a remote switch 28 coupled to the projector by way of remote function receptacle 29. AC power is coupled by way of plug 30 to lamp 26 and slide switch 24. Slide switch 24 is shown in its off position and is slidable so that the bars 31 and 32 move, in unison, to different sets of contacts 33. As the switch bars 31 and 32 are manually moved to the right, the following operation is provided in sequence; (1) the motor 22 is enabled for operation, (2) the lamp 26 is operated at a predetermined light level limited by resistor 34, and (3) the lamp 26 is operated at full light level, the motor 22 is enabled and power is provided to the accessory receptacle 36. The accessory receptacle 36 actually forms a part of the remote function receptacle 29 and the output from the lamp control circuit 12 of the adapter couples to receptacle 36 for controlling the illumination of lamp 26 as discussed in more detail hereinafter.

Typically, when the remote switch 28 is moved to its "forward" position a short circuit is provided across terminals F and C thereby causing the projector to forward slide advance. Alternatively, a closure across terminals C and R causes the projector to reverse slide advance. In the present invention the adapter, as shown in the block diagram in FIG. 1 and the circuit diagram in FIG. 3, replaces the remote switch 28. The cycle switch 38 shown in FIG. 2 is discussed hereinafter with reference to the operation of the adapter of the present invention.

With respect to the block diagram of FIG. 1 the connection to the power control circuit 10 is provided by way of terminals F and C. The connection to the lamp control circuit 12 of the adapter is made by way of the accessory receptacle 36 shown in FIG. 2.

Figure 3:
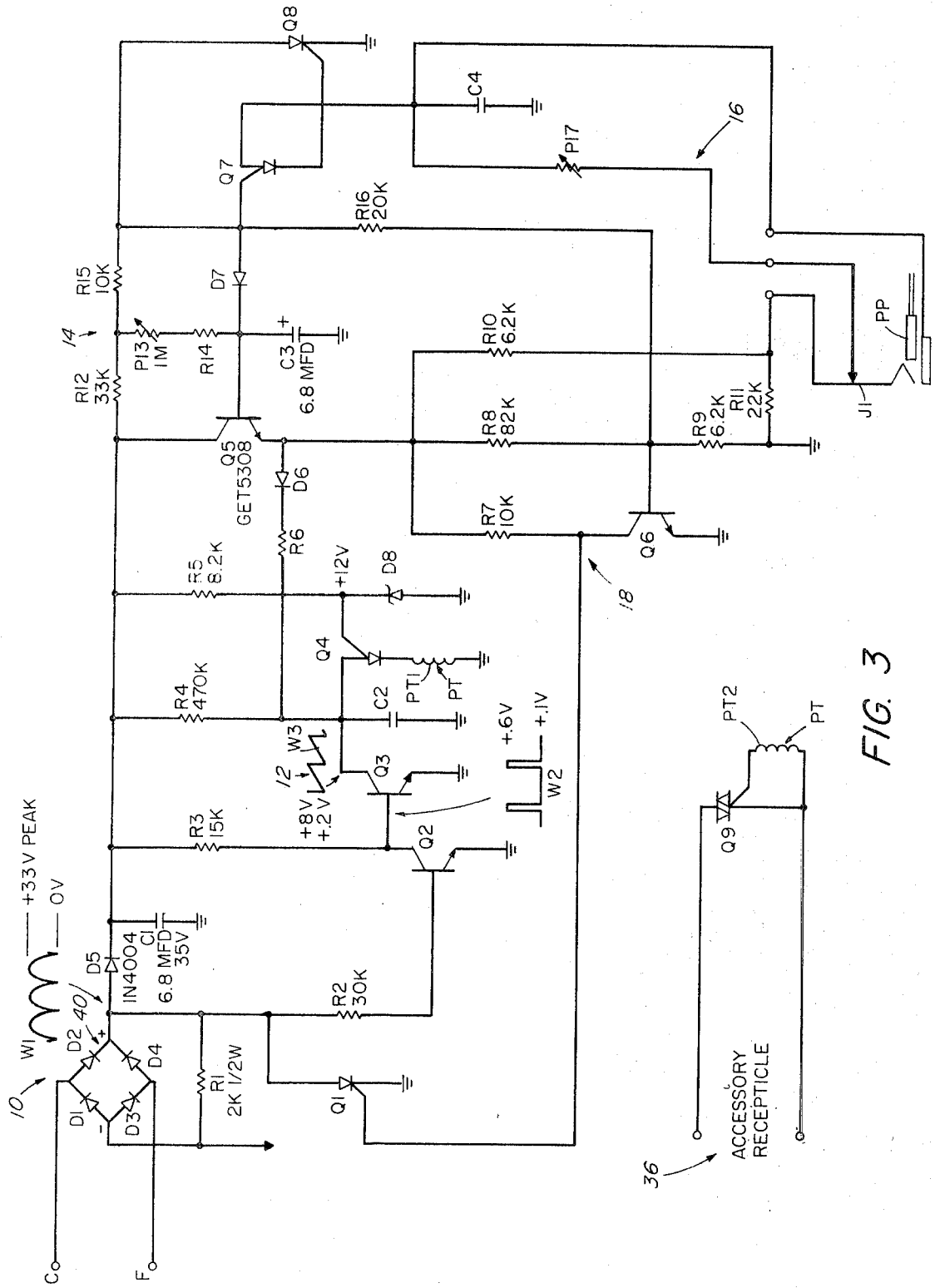
FIG. 3 is a circuit diagram of an adapter constructed in accordance with the principles of the present invention.

Referring now to FIG. 3 it is noted that there is no connection from the adapter to the R terminal of the projector and the power of the projector is coupled by way of its female terminals F and C to the corresponding male plugs, for example, shown in FIG. 3 as terminals F and C of the adapter. The adapter comprises power control circuit 10, lamp control circuit 12, advance driver 18, dissolve timer 14, and cycle timer 16, as previously indicated in the block diagram of FIG. 1.

The power control circuit comprises a full wave bridge 40 including diodes D1–D4 connected in a conventional manner, isolating diode D5, and storage capacitor C1 across which a DC voltage of approximately 30 volts can be developed from the 24 VAC input signal to bridge 40. FIG. 3 also shows the wave form W1 at the output of the bridge circuit 40. This signal is fed to lamp control circuit 12. The voltage developed across capacitor C1 is coupled to the lamp control circuit and the dissolve timer 14.

A full wave bridge 40 is used in the embodiment of FIG. 3 in order to generate synchronization signals for lamp control circuit 12. Resistor R1 couples across the output terminals of bridge 40 and is used to insure that the unfiltered bridge output is clamped to zero volts at that point in time when the AC signal voltage crosses through zero volts. A silicon controlled rectifier (SCR) Q1 is rendered conductive to provide a slide advance of the projector. When this SCR fires it presents a low impedance path across the bridge and allows energizing current to flow through the projector slide advance solenoid 20, shown in FIG. 2. The operation of SCR Q1 is discussed in more detail hereinafter with regard to the mode of operation of the cycle timer.

As previously mentioned, the control of the projector lamp 26 (see (FIG. 2) is controlled by way of accessory receptacle 36 which is shown in both FIGS. 2 and 3. The alternating voltage applied to accessory receptacle 36 is controlled by Triac Q9 which is in turn controlled from unijunction transistor Q4 of the lamp control circuit.

The waveform W1 generated at the output of bridge 40 is coupled by way of resistor R2 to the base of transistor Q2, whose emitter is grounded. The collector of transistor Q2 couples to the base of transistor Q3 and also couples by way of resistor R3 to the + 30 VDC supply provided across capacitor C1 when power is being received at input terminals C and F. Transistors Q2 and Q3 provide sync pulse information to phase control timing capacitor C2 which is coupled from the collector of transistor Q3 to ground.

In operation, the unfiltered voltage from the full wave bridge 40 couples to the base of transistor Q2 via resistor R2 and maintains transistor Q2 in saturation during most of the positive peak of waveform W1. During the time that transistor Q2 is saturated, the low voltage signal at the base of transistor Q3 maintains that transistor non-conducting. However, when the voltage of the input AC waveform W1 drops below +0.7 volts, transistor Q2 turns off and transistor Q3 is permitted to turn on by way of the base current provided through resistor R3. Waveform W2 shows a typical pulse waveform to the base of transistor Q3, and the voltage levels associated therewith. Waveform W3 shows the voltage pattern at the collector of transistor Q3 which voltage is developed across capacitor C2. From waveform W3 it is noted that when transistor Q3 conducts, capacitor C3 discharges rapidly to approximately +0.2 volts. The conducting time for transistor Q3 is less than 0.5 milliseconds. When transistor Q3 turns off, capacitor C2 charges to a level of about +8 volts by way of resistor R4. When this 8 volt level is reached transistor Q3 again conducts to discharge capacitor C2. The waveform W3 is shown as a linear saw-tooth waveform. This is only an approximation which is relatively accurate as long as the time constant of resistor R4 and capacitor C2 is relatively large.

The lamp control circuit also comprises a programmable unijunction transistor (PUT) Q4 which has the primary winding PT1 of pulse transformer PT connected to its cathode electrode, with the corresponding secondary winding PT2 coupled to Triac Q9. The alternating voltage passed by transistor Q4 controls the conduction of Triac Q9 which in turn controls the level of illumination, and rate of change thereof, of projector lamp 26.

The gate electrode of transistor Q4 couples to the cathode of zener diode D8. The anode of diode D8 is coupled to ground, and zener diode D8 along with resistor R5 establish a +12 volt level at the gate electrode of transistor Q4. The zener diode is necessary to provide additional filtering for smooth firing of transistor Q4 throughout the operating cycle. Since transistor Q4 requires its anode to be about 0.6 volts more positive than its gate electrode to cause firing, transistor Q4, and in turn Triac Q9 cannot become conductive until the anode of transistor Q4 is raised to a higher positive level than the gate electrode. It can be seen that the waveform W3, per se, shown in FIG. 3 does not raise the voltage sufficiently across capacitor C2 to cause conduction of transistor Q4. The alternating conduction of transistor Q4 is accomplished by way of resistor R6 and diode D6 which connect in series to the anode of transistor Q4. This second path to capacitor C2 by way of diode D6 provides a slowly varying control current to capacitor C2 for causing alternating control of Triac Q9 by way of pulse transformer PT. Hence, raising the DC level to diode D6 will raise the illumination level of the slide projector lamp 26. The lamp is fully on when the input to diode D6 is at approximately +14 volts.

In order to discuss the functional operation of the dissolve timer, cycle timer and advance driver, it can be assumed that the adapter is operating such that capacitor C3 of the dissolve timer is fully charged, transistor Q4 is alternately conducting and Triac Q9 which couples to receptacle 36 is maintaining the projector lamp 26 at a full illumination level. In addition to capacitor C3, the dissolve timer comprises transistor Q5, resistor R14 and dissolve rate potentiometer P13. The dissolve timer also may be considered as comprising unijunction transistor Q7 and SCR Q8 which control the operation of the timing circuit of the dissolve timer which basically comprises capacitor C3, resistor 14 and potentiometer P13.

When capacitor C3 is fully charged, there is approximately +15 volts developed thereacross which is coupled to the base of transistor Q5. The emitter of transistor Q5 which is coupled to the anode of diode D6 is at approximately +13.8 volts, and the collector of transistor Q5 is coupled to the +30 volts provided by way of capacitor C1. Resistors R12, R15 and R16 provide a voltage divider, and when unijunction transistor Q7 is in its non-conducting state a voltage of approximately +15 volts is developed at the junction between resistors R12 and R15 and approximately +10 volts is developed at the junction between resistors R15 and R16. Under these conditions diode D7 is reverse-biased. Transistor Q5 may be replaced by a Darlington transistor pair, and in either case it monitors the charge on capacitor C3 and provides a high input impedance necessary to prevent loading of the charging circuit which comprises capacitor C3. The aforementioned voltage divider of resistors R12, R15, and R16, in addition to providing the upper level for the charge on capacitor C3, also sets the voltage at the gate electrode of transistor Q7 thereby controlling the voltage at which the unijunction transistor Q7 conducts.

In the circuit embodiment of FIG. 3, the advance driver shown previously in the block diagram of FIG. 1 may be considered as comprising transistor Q6 which is rendered non-conductive to thereby, in turn, cause conduction of SCR Q1 when a slide advance takes place at the end of the predetermined interval defined by the cycle timer. The cycle timer in FIG. 3 may be considered as comprising capacitor C4 and potentiometer P17. This RC time constant network controls the conduction of transistor Q7.

In FIG. 3 the connector J1 is in its closed position and the voltage divider which comprises resistors R10 and R11 provides a voltage of approximately +11 volts by way of jack J1 to one side of potentiometer P17. Thus, capacitor C4 is charged at a rate determined by the setting of potentiometer P17 towards a voltage of approximately +11 volts after the lamp has been fully illuminated. When the charge on capacitor C4 reaches a voltage level slightly more positive than the voltage fixed at the gate electrode of transistor Q7, transistor Q7 conducts discharging capacitor C4 into the gate electrode of SCR Q8. The discharge of capacitor C4 indicates the end of the time interval between slides and the sequence of operation is such that the lamp is gradually faded out, a slide advance occurs, and the lamp is gradually turned on after the new slide is in position. The dissolving in and out of the lamp is controlled by the dissolve rate potentiometer P13.

As previously indicated, SCR Q8 turns on at the end of the period determined by the cycle timer and the voltage at the junction between resistors R15 and R16 reverts to approximately +0.6 volts. A base current which has been provided by way of resistor R16 to the base of transistor Q6 ceases and the voltage at the junction of resistors R12 and R15 is reduced to approximately +7 volts. Capacitor C3 which had just previously been charged to a +15 volt level then starts to discharge through resistor R14 and potentiometer P13, at a rate determined by the setting of the potentiometer. This operation commences the dissolving down of the projector lamp. As capacitor C3 discharges, the input to diode D6 is proportionately reduced, hence the lamp illumination falls off at a rate determined by potentiometer P13. When capacitor C3 reaches approximately a +9 volt level the projection lamp 26 is no longer illuminated. At the +9 volt level of capacitor C3 however, the capacitor has not discharged to the +7 volt level set by the resistor voltage divider and the conduction of SCR Q8, and thus capacitor C3 continues to discharge. The voltage at the base of transistor Q6 which is coupled by way of resistor R8 eventually drops below the +0.6 volt level set by the voltage divider including resistors R8 and R9. When the voltage decreases sufficiently, transistor Q6 ceases conduction. At that time SCR Q1 which was previously clamped to near ground potential by transistor Q6 is allowed to conduct by means of gate current flowing via resistor R7 to the gate electrode to SCR Q1. The turning on of SCR Q1 shorts the output of the full wave bridge 40 and energizing current flows through the projector slide advance solenoid 20 (see FIG. 2). Concurrently therewith, the input voltage to diode D5 collapses and the input filter capacitor C1 starts to discharge. As C1 discharges so does capacitor C3. When the charge on capacitors C1 and C3 are near depletion the slide advance mechanism in the projector opens its internal cycle switch 38. This switch breaks power to the slide advance solenoid and also to the adapter of the present invention. Therefore, the capacitors C1 and C3 become fully discharged thereby reverting SCRs Q1 and Q8 to their non-conducting states. Upon completion of a slide advance the projector cycle switch 38 closes and power is again restored to inputs C and F. When power is restored the 24 volt AC signal coupled by way of bridge 40 charges capacitor C1 and the base of transistor Q6 is quickly forward biased by way of resistors R12, R15 and R16. Thus, transistor Q6 is quickly rendered conductive and the gate electrode of SCR Q1 is rendered non-conductive. It is noted that the collector voltage of transistor Q6 lags the base voltage because the emitter voltage of transistor Q5 cannot increase as rapidly as can the base voltage of transistor Q6. The emitter voltage of transistor Q5 increases exponentially and thus the collector voltage of transistor Q6 lags the base voltage of transistor Q6. If this operation is not provided then SCR Q1 could conduct and the projector would repeatedly slide advance which is not desirable.

After the slide advance has occurred and capacitor C1 has charged to +30 volts, the dissolving of the projector lamp now commences. With capacitor C1 charged to 30 volts, diode D7 now conducts rapidly because the charge on capacitor C3 has been deleted and capacitor C3 is brought up to a charge level of approximately +10 volts very quickly. This +10 volt level is set by the voltage divider including resistors R12, R15 and R16. Also, this +10 volt level is near the threshold level required for visible lamp illumination. After this initial charge interval provided by diode D7 ends capacitor C3 continues to charge by way of resistor R14 and potentiometer P13. During this further charging interval diode D7 is back-biased and no further conduction can occur in that path. The charging of capacitor C3 causes projector lamp illumination to increase at a rate determined by the setting of potentiometer P13. The slowly varying essentially DC voltage coupled to the anode of diode D6 changes at a rate determined by potentiometer P13. When capacitor C3 is fully charged the projector lamp is at full illumination and capacitor C4 once again charges at a rate determined by the setting of potentiometer P17. Eventually, transistor Q7 again fires after the timing circuit comprising capacitor C4 and potentiometer P17 has timed out and the previously described sequence repeats.

The firing of transistor Q7 may be on a demand basis by inserting a phone plug PP into jack J1. This breaks connection to resistor R17 thereby removing the charging part to capacitor C4. The +11 volt level provided when capacitor C3 is fully charged is no longer available to potentiometer P17. Hence, the lamp will remain on until a closure is made across the phone plug which will cause transistor Q7 to fire thereby starting the dissolving down of the projector lamp.

With the arrangement shown in FIG. 3 the voltage divider that comprises resistors R10 and R11 is provided so that when the jack J1 is closed the capacitor C4 cannot charge to a level necessary to fire transistor Q7 until capacitor C3 has been fully charged. Only when capacitor C3 is fully charged will there be an +11 volt level coupled to potentiometer P17. Before the full charging of capacitor C3 this voltage level is lower and thus capacitor C4 cannot be charged to a sufficient voltage level to cause firing of transistor Q7.

Having described one embodiment for the adapter of the present invention, it should now be obvious that other embodiments are contemplated as falling within the scope of this invention. For example, the adapter has been disclosed as one for use with a Kodak projector. However, it is expected that this adapter can be modified for use, when necessary, with other makes of slide projectors. In some cases it may be advantageous to modify the circuit of FIG. 3 when used with differently designed slide advance mechanisms.

I claim:

1. For a slide projector means having slide illuminating lamp means, an adapter coupled to a connector means of the projector means for providing automatic picture dissolve, comprising:
    means coupled from said connector means for providing power to said adapter:
    first timing means defining a first predetermined time period representative of the time interval between slides;
    second timing means coupled to and responsive to said first timing means and defining a pair of predetermined dissolve intervals for controlling the lamp means;
    means coupled intermediate said connector means and second timing means for controlling illumination of said lamp means at a relatively constant light level during a portion of said first time period, at an increasing level during a first of said dissolve intervals and at a decreasing light level during a second of said dissolve intervals;
    and means responsive to the termination of said second dissolve interval for providing a slide advance signal.

2. The adapter of claim 1 wherein during a slide advance power provided from said projector is temporarily interrupted and when again applied causes commencement of said first dissolve interval.

3. The adapter of claim 1 wherein each said dissolve interval is shorter in duration than said first predetermined time period.

4. The adapter of claim 1 wherein said power providing means includes an AC to DC converter circuit and said signal providing means includes a shunting means.

5. The adapter of claim 4 wherein said converter includes a bridge circuit and said shunting means includes a semiconductor device that is normally nonconductive but conducts to short across said bridge circuit and in turn cause a slide advance.

6. The adapter of claim 1 including means for preventing termination of said first predetermined period until after termination of said first dissolve interval.

7. The adapter of claim 1 wherein said first timing means includes an exponential charging network.

8. The adapter of claim 1 including means for adjusting the duration of the first predetermined time period.

9. The adapter of claim 1 including means for adjusting the duration of both said dissolve intervals.

10. The adapter of claim 1 wherein said second timing means includes a charge/discharge network.

11. The adapter of claim 1 wherein said means for controlling includes means for generating a cyclic alternating signal and means coupled from said second timing means for controlling the amplitude of said alternating signal.

12. The adapter of claim 11 wherein said power providing means includes a bridge circuit having an output coupled to said means for generating a cyclic alternating signal, and said means for controlling further comprises a triac and pulse transformer coupled from said means for generating for controlling conduction of said triac.

13. The adapter of claim 12 wherein said means for generating includes a unijunction transistor having an input coupled from said second timing means.

14. The adapter of claim 1 wherein said second timing means includes a capacitor that is cyclically charged from said power providing means, said second timing means having an input coupled to said capacitor for controlling the maximum charge on said capacitor.

15. The adapter of claim 1 including means for adjusting said first predetermined time period independent of said dissolve intervals, and means for adjusting the duration of both said dissolve intervals.

16. The adapter of claim 15 wherein said dissolve interval adjusting means includes a common variable resistance means.

17. For a slide projector means having a slide illuminating lamp means, an adapter coupled to a connector means of the projector means for providing automatic picture dissolve, comprising:
  means coupled from said connector means for providing power to said adapter;
  first timing means defining a first predetermined time period;
  second timing means coupled to said first timing means and defining a pair of predetermined dissolve intervals for controlling the lamp;
  means coupled intermediate said connector means and second timing means for controlling illumination of said lamp means at a relatively constant light level during a portion of said first time period, at an increasing level during a first of said dissolve intervals and at a decreasing light level during a second of said dissolve interval;
  and means responsive to the termination of said second dissolve interval for providing a slide advance;
  said second timing means comprising a charge/discharge network including resistive means for establishing a first voltage for controlling said network, and means responsive to the termination of said first predetermined time period for establishing a second voltage for controlling said network.

18. The adapter of claim 17 wherein said first voltage controls the charging of said network and said second voltage controls the discharging of said network.

19. The adapter of claim 18 comprising high input impedance semiconductor means for monitoring the voltage across a capacitor of said network.

20. The adapter of claim 19 wherein said semiconductor means has an output coupled to said means for controlling illumination of said lamp, for in turn controlling the output current to said lamp.

* * * * *